(12) United States Patent
Boodaei et al.

(10) Patent No.: US 8,732,794 B2
(45) Date of Patent: May 20, 2014

(54) BROWSER PLUG-IN FIREWALL

(75) Inventors: Michael Boodaei, Givatayim (IL); Amit Klein, Herzliya (IL); Oleg Izmerly, Ramat Gan (IL)

(73) Assignee: Trusteer Ltd., Tel Aviv (IL)

( * ) Notice: Subject to any disclaimer, the term of this patent is extended or adjusted under 35 U.S.C. 154(b) by 907 days.

(21) Appl. No.: 12/189,444

(22) Filed: Aug. 11, 2008

(65) Prior Publication Data

US 2009/0064309 A1 Mar. 5, 2009

Related U.S. Application Data

(60) Provisional application No. 60/955,403, filed on Aug. 13, 2007.

(51) Int. Cl.
*G06F 7/04* (2006.01)
*G06F 17/30* (2006.01)

(52) U.S. Cl.
USPC .............................. 726/2; 713/170

(58) Field of Classification Search
USPC .................................... 726/2, 4, 42
See application file for complete search history.

(56) References Cited

U.S. PATENT DOCUMENTS

| | | | | |
|---|---|---|---|---|
| 7,664,862 | B2* | 2/2010 | Barton et al. | 709/227 |
| 7,810,148 | B2* | 10/2010 | Ben-Shachar et al. | 726/11 |
| 2003/0046548 | A1* | 3/2003 | Brown et al. | 713/182 |
| 2003/0149801 | A1* | 8/2003 | Kushnirskiy | 709/328 |
| 2006/0041759 | A1* | 2/2006 | Kaliski et al. | 713/184 |
| 2007/0016949 | A1* | 1/2007 | Dunagan et al. | 726/22 |
| 2008/0028444 | A1* | 1/2008 | Loesch et al. | 726/4 |
| 2008/0228910 | A1* | 9/2008 | Petri | 709/224 |
| 2009/0083369 | A1* | 3/2009 | Marmor | 709/203 |
| 2010/0146379 | A1* | 6/2010 | George et al. | 715/234 |

OTHER PUBLICATIONS

Paul A. Fishwick; Web-based simulation: some personal observation; Year: 1996; ACM; pp: 1-8.*

Ingham et al. "A History and Survey of Network Firewalls." *ACM Journal Name*, vol. V, No. N, Month 20YY, pp. 1-42. Retrieved Jan. 7, 2009, http://www.cs.unm.edu/~treport/tr/02-12/firewall.pdf.

"An introduction to client firewalls." May 2005. *Sophos*. Retrieved Jan. 7, 2009, <http://www.sophos.com/whitepapers/Sophos-client-firewalls-wpuk.pdf>.

* cited by examiner

*Primary Examiner* — Mohammad W Reza
*Assistant Examiner* — Monjour Rahim
(74) *Attorney, Agent, or Firm* — Merchant & Gould P.C.

(57) ABSTRACT

A browser plug-in firewall manages data exchanged between a browser and a plug-in according to a pre-defined list of rights.

9 Claims, 3 Drawing Sheets

BROWSER PLUG-IN FIREWALL

This application claims benefit to Ser. No. 60/955,403, filed 13 Aug. 2007, and which application is incorporated herein by reference.

FIELD OF THE INVENTION

The present invention relates to internet security and more particularly to a system allowing filtering data using a browser plug-in firewall.

BACKGROUND OF THE INVENTION

A browser is a software application enabling a user to display and interact with information (text, images, audios and videos records and streams, forms, etc.) located on a page (also called, webpage) at a website on a network (such as the World Wild Web or an intranet). Any information on a webpage has an associated attribute allowing the linking of this information to other information at another location of a network.

Different protocols are available and allow communication through a network, and handling data in a large number of formats, such as HTML.

As an example, FIG. 1 is a simplified model of "client-server architecture". A client 101 (a browser) initiates a request 103 to a server 105 (a website). A server 105 receives the request 103, and replies with a message 107 containing, a requested file, an acknowledgement, an error message, or some other information.

A plug-in (also called "browser plug-in") expands the functionalities of a browser by adding extra features to it. Many browser plug-ins are visible to the user and he/she can interact with these plug-ins. A plug-in can be, as an example, a toolbar, a search assistant or a set of functions allowing blocking pop-up windows. Others plug-ins are not visible to users and run without Graphical User Interface (GUI). However, some plug-ins, visible and invisible, can be malicious and can, for example, spy on the users (e.g. obtain unauthorized access to personal information and transmit it to a third party).

In order to reduce the risks generated by malicious plug-ins and more generally by malicious software, some approaches are available, such as the firewall technologies, which can highly limit the intrusion and the hijacking of personal data.

A firewall is a device or a software dedicated and configured in order to permit, to deny, to encrypt or to proxy computer traffic over a network connection, according a set of rules. Said network can be an organization network or the Internet. In all contexts, personal firewalls can be used in order to protect a single host by limiting the types of processes that are allowed to perform specified activities.

It is a severe drawback of network/personal firewalls, that they are useless when the user installs a malicious plugin. The plugin runs in the context of a trusted process (the browser, e.g. Microsoft Internet Explorer), and uses standard outgoing traffic (HTTP) to send stolen data out to an unauthorized location. Such activity cannot be distinguished from legitimate traffic sent by the same browser process. So a personal firewall doesn't affect malicious plug-ins, because they run within the realm of a trusted process and behave, for all it matters to the personal firewall, like the browser. Likewise, once the PC is infected, a network firewall is useless against malicious plug-ins, because they generate traffic that is indistinguishable from that of the browser.

It is an object of the present invention to increase the security of the data exchanged between a web browser using plug-ins and a website.

It is another object of the present invention to provide a firewall dedicated to browser(s).

It is yet another object of the present invention to provide a software firewall which patches the functions used by a browser to load or to create a plug-in object.

It is still another object of the present invention to provide software allowing to prevent malicious software from getting data.

It is a further object of the present invention to provide a software preventing plug-ins from gaining access to a browser internal data structure.

Further purposes and advantages of this invention will become apparent as the description proceeds.

SUMMARY OF THE INVENTION

The invention relates to a browser plug-in firewall managing data exchanged between a browser and a plug-in according to a pre-defined list of rights. According to one embodiment of the invention protection for a browser is defined per website, per page, per plug-in and per field of a form.

In one embodiment the browser plug-in firewall of the invention comprises control means to allow the user of a browser to choose which data said browser sends to a plug-in.

According to another embodiment of the invention the browser plug-in firewall comprises an embedded proxy emulating said browser, and an embedded proxy emulating a plug-in, thereby to protect said browser from malicious plug-ins.

The invention also encompasses a method for protecting a browser from malicious plug-ins, comprising providing at least one plug-in-proxy object and at least a browser-proxy object, interposed the browser and a plug-in, such that neither said web-browser sees the plug-in directly, nor the plug-in sees the web-browser directly, wherein the ensemble of said browser-proxy object and of said plug-in-proxy operates as a firewall for said browser.

According to one embodiment of the invention, when the browser first attempts to load the plug-in the Browser Plug-in Firewall (BPF) intercepts the call and creates a plug-in proxy object and hands it to the browser. In one embodiment of the invention the BPF loads the requested plug-in itself, and saves its address. In another embodiment of the invention the BPF presents the browser to the plug-in as a browser proxy object.

All the above and other characteristics and advantages of the invention will be further understood through the following illustrative and non-limitative description of preferred embodiments thereof, with reference to the appended drawings.

BRIEF DESCRIPTION OF THE DRAWINGS

FIG. 2 is a schematic representation of an exchange of communication between a client and a server using a plug-in.

DETAILED DESCRIPTION OF PREFERRED EMBODIMENTS

Figure 1:
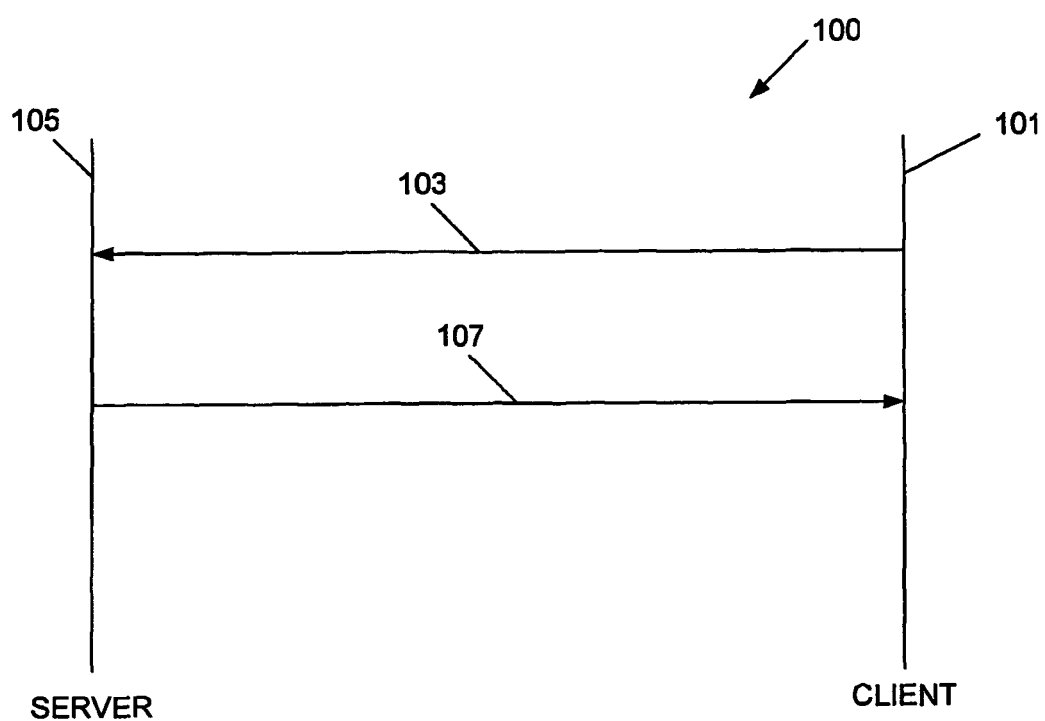
FIG. 1 is a schematic representation of a "classical" request/response flow between a web-browser and a server.

FIG. 1 is a simplified representation of a communication 100 between a client 101 (a browser) and a server 105 (i.e. a website). Client 101 sends a request 103 to server 105. Replying to the request 103 server 105 sends an answer 107, which can be a requested file (such as an HTML one), an acknowledgement, an error message, or other information.

Figure 2:
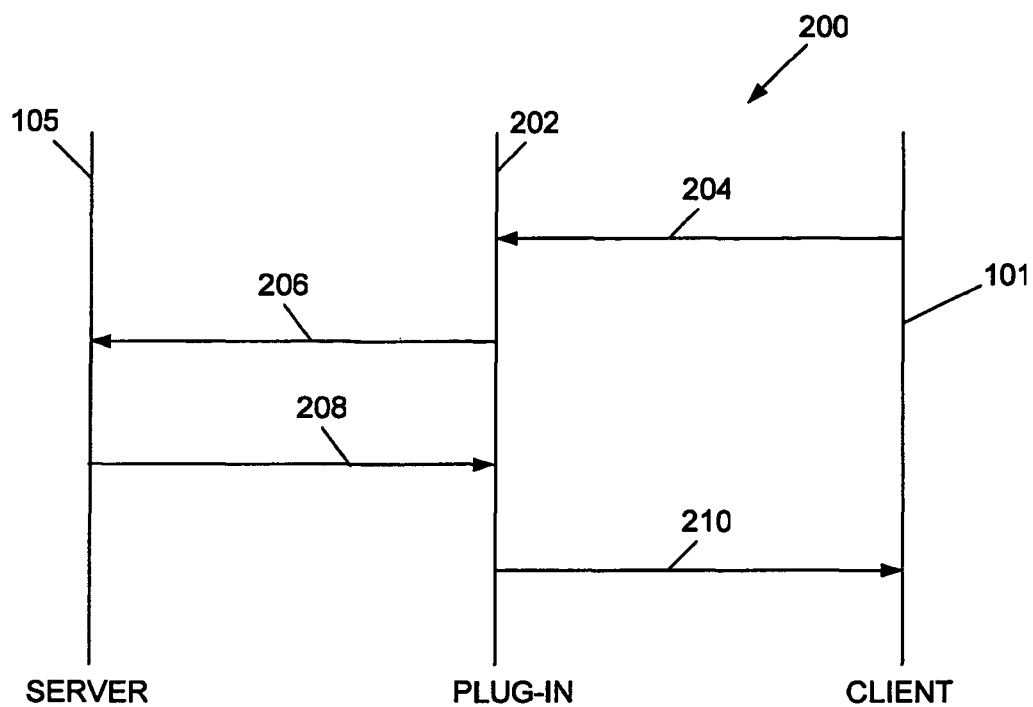

FIG. 2 is an example of a simplified representation of one example of a communication 200 between a browser 101 and a server 105 involving plug-in 202, which can be, for example, malicious software. Client 101 sends a request 204 to server 105. This request 204 is intercepted by plug-in 202, which can transmit, destroy or change said request 204. A new request 206 is received by server 105. Answer 208 from server 105 to browser 101 is intercepted by malicious software 202 which can transmit, destroy or change said response 208. If changed, a new response 210 is transmitted to client 101.

This is a typical "Man in the Browser" implementation via a browser plug-in.

Plug-ins can perform a great variety of operations. For instance, they can listen in on events (such as keystrokes), can encrypt and can decrypt messages, can play video and audio streams or edit documents. Credentials input by the user during a visit to a website 105, for instance, can be stolen using a malicious plug-in 202. To prevent such occurrences appropriate firewalling solutions must be provided. In the example to follow a plug-in operates as a proxy however, as said, a plug-in may assume many other functionalities besides operating as a proxy.

According to an embodiment of the present invention, protection is provided for browser of web user 101 against "Man in the Browser" attacks, and generally against malicious browser plug-ins 202.

According to yet another embodiment of the present invention, protection is provided on a per-page and per-plug-in basis. As an example, the invention allows a plug-in to run on all sites except a set of "more sensitive" sites. As another example, the invention can fully allow or fully deny or partially allow or partially deny a request.

According to another embodiment of the present invention, the firewalling element is pre-loaded with a set of rules, which determine one or more of the following:
(1) for each plug-in if it is an allowed or a denied one;
(2) for which website and/or page of a website and/or which field of a page of a website should access be granted or denied; and
(3) for allowed plug-ins—access rights such as allowing or denying reading, writing, modifying, deleting pre-defined data.

Figure 3:
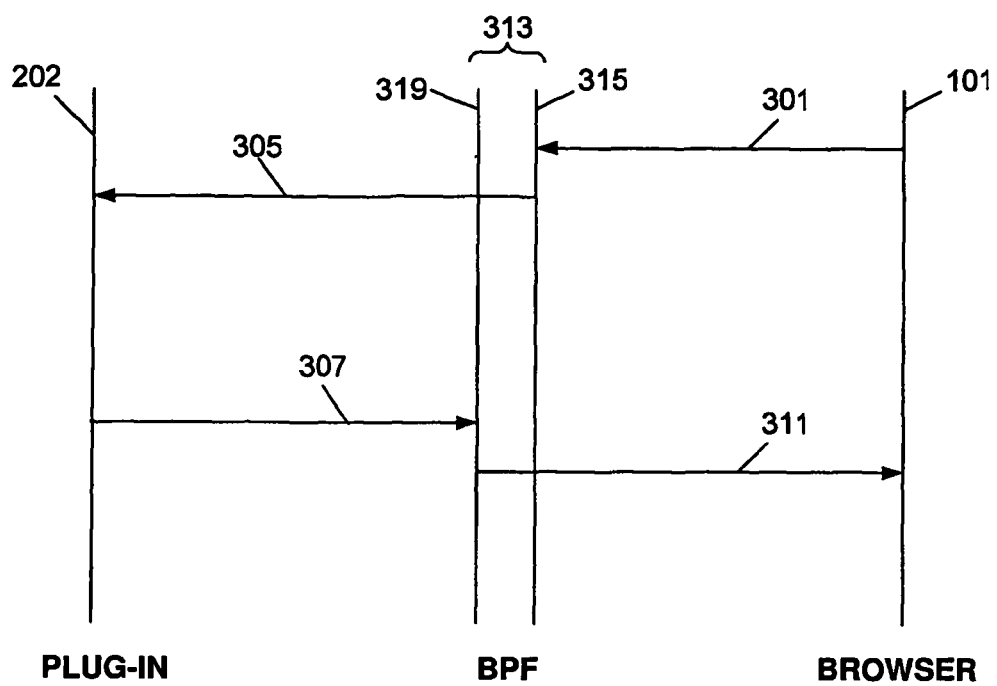
FIG. 3 is a schematic representation of the internal data flow according to one embodiment of the present invention.

FIG. 3 is a schematic representation of the internal data flow into Browser-Plug-In Firewall (BPF) 313. According to an embodiment of the present invention, BPF 313 comprises at least one plugin-proxy object 315 and at least a browser-proxy object 319. This allows BPF 313 to interpose itself between the browser 101 and a plug-in 202. As a non-limitative example, BPF 313 is a "proxy" between a web-browser 101 and a plug-in 202, such that neither a web-browser 101 sees plug-in 202 directly, nor plug-in 202 sees the web-browser 101 directly. Instead, each party (web-browser 101, plug-in 202) sees the BPF 313, which emulates the other party.

According to an embodiment of the present invention, when the browser 101 first attempts to load the plug-in 202, the BPF 313 intercepts this call 301 and presents said plug-in 202 to the browser 101 as the plug-in (proxy) 315, that is, it creates a plug-in proxy object 315 and hands it to the browser 101. BPF 313 loads the requested plug-in 202 itself, and saves its address, in the plug-in-proxy object 315. BPF 313 presents itself to the plug-in 202 as the browser 101, more particularly BPF 313 presents the browser to the plug-in 202 as a browser proxy object 319.

In an example of operation (without BPF), during a communication between web-browser 101 and plug-in 202, web-browser 101 tries to send request 301 to plug-in 202. More accurately, the browser 101 and plug-in 202 communicate via a model of subscription/invocation. The browser 101 invokes an initial plug-in function, hands a pointer to the browser (interface), which the plug-in 202 can interrogate; the plug-in 202 invokes the browser interface, finds the browser's subscription function, and subscribes to browser events through it. Browser 101 then invokes the event handler of the plug-in 202 whenever an event occurs.

The same process with BPF would take place as following: web browser 101 invokes an initial plug in function of the plug-in proxy 315, and hands it a pointer to the browser interface. The plug-in proxy 315 invokes the respective function in the plug-in 202, providing it with a pointer to the interface of the browser proxy 319. The plug-in 202 interrogates this interface, finds the subscription function (provided by the browser proxy 319) and subscribes to browser events by invoking it. The plug-in proxy in turn subscribes to the same events using the same interface of the browser 101. Browser 101 then invokes the event handler of browser proxy 319 whenever an event occurs. In turn, the browser proxy 319 may invoke the event handler of the plug-in 202, or not, with the original event data, or with modified event data, all according to rules (security policy), which may depend on e.g. the identity of the plug-in, the current event, and the context of the event (site, page, form, fields).

In another example plug-in 202 invokes functions in browser 101, to gain access to the browser's internal data structures. Request 301 (which may be an invocation by the browser of a plug-in function, handing over a pointer to the browser's data structures/interfaces to, the plug-in) is intercepted by BPF 313 and more particularly by the plug-in proxy 315 emulating plug-in 202. The request is sent to an analyzing element of BPF 313 (not shown in the figure), which may be internal or external to plug-in proxy 315 and to browser proxy 319, which checks it and sends it as a "new" request 305 to plug-in 202. Plug-in 202 can use the data provided in request 305 and send a request for information from the browser 307 to browser 101. However, BPF 313 intercepts message 307, using browser-proxy 319 emulating browser 101, and a "new" message is routed to the aforementioned analyzing element which checks it, filters it and/or modifies it in order to generate a "secure" subsequent request 311 which is sent to browser 101. Another possibility is to filter the browser's response to request 307/311.

According to another embodiment of the invention, plug-in 202 can subscribe to browser 101 events, but since the plug-in 202 does not have direct access to the browser 101, plug-in 202 actually invokes the browser-proxy 319 subscription function, and the browser-proxy in turn subscribes the respective plug-in-proxy 315 to the same events in the browser 101.

According to some embodiments of the present invention, during the browser 101 run-time, events are fired, such as form submissions, URL navigations and document load/unload, to which the plug-in-proxy 315 is subscribed. When the events reach the plug-in-proxy 315, it can decide in real-time, per site or URL or form, per event type, and per plug-in, whether to forward the event to the plug-in 202. When plug-in 202 receives the event, it may also attempt to access the browser 101 in order to interact with it. But again, it does not have a direct pointer to the browser object, but rather can communicate only with the BPF object (particularly with the browser proxy 319). BPF 313 may decide, again, per site or per URL, per plug-in, and per requested action, whether to allow the plug-in to perform the desired action or not. The decision of whether to forward an event to the plug-in 202, and what access is granted to the plug-in 202 is based upon whether the plug-in is signed, and/or on black-lists and white-lists of plug-in signatures, as well as on any other information available on the plug-in, such as its vendor, code patterns, signature values, type, etc.

According to yet another embodiment of the present invention, BPF 313 is installed by loading code into browser 101, which patches the function(s) that are used by browser 101 to load/create the plug-in objects. The patched function creates a plug-in proxy object 315 (for the browser 101), and a browser proxy object 319 (for the plug-in 202), instead of the actual plug-in 202, provides the plug-in 202 with the browser proxy 319, and returns the plug-in proxy 315 to the browser 101 (as the "created" plug-in 202).

Uninstalling can be as simple as closing the browser 101, or just un-patching the installation function (still leaving all created plug-ins 202 in proxy mode).

According to still another embodiment of the present invention, it is possible to change the BPF 313 configuration using a Graphical User Interface (GUI). As an example, said GUI can allow to control some of the browser protection policy such what plug-ins are allowed or disallowed, according to their description, their publisher, their type, their path, whether they are correctly signed, or via any other signature (e.g. MD5 checksum).

According to a further embodiment of the present invention, "updating" of pre-loaded rules can be done, for instance, by downloading new versions of black lists and white lists from a central server.

According to yet a further embodiment of the present invention, the BPF can assume multiple user profiles, so that each user of a shared computer can define his/her own rules.

According to another embodiment of the present invention, the BPF can interact with a personal firewall as well as with antivirus and anti-spyware software. For example, a personal firewall and/or an antivirus and/or an anti-spyware program may notice that a new plug-in is installed, and can tag said plug-in as a suspicious or an approved one. This information, if it is fed to the BPF, can alter the BPF's policy enforced for this plug-in. Likewise, the BPF may alert the rules of the personal firewall and/or antivirus and/or anti-spyware, if a plug-in makes any malicious and/or suspicious attempts. The personal firewall and/or the antivirus and/or the antispyware may, upon such indication, attempt to remove or to uninstall or to quarantine said plug-in. If the plug-in was installed as part of a larger installation, the whole installation may thus be suspected and acted upon.

Although embodiments of the invention have been described by way of illustration, it will be understood that the invention may be carried out with many variations, modifications, and adaptations, without exceeding the scope of the claims.

The invention claimed is:

1. A browser plug-in firewall installed on a computerized device that runs a browser, said browser plug-in in combination with said computerized device in combination comprising:
   a. at least one plug-in proxy object for emulating said browser to a plug-in;
   b. at least one browser-proxy object for emulating said plug-in to said browser; and
   c. a code embedded in said browser, which patches functions used by said browser to load or to create said objects, for protecting said browser from a malicious plug-in that communicates with said browser through an interface and managing data exchanged between said browser and said plug-in, according to pre-defined security rules, by:
      interposing said browser and said plug-in, such that neither said web-browser sees the plug-in directly, nor does the plug-in see the web-browser directly;
      controlling the data exchanged between said browser and said plug-in, to choose which data said browser sends to said plug-in and vice versa by intercepting calls from said browser to said plug-in and vice versa and forcing said calls to pass through said proxy objects;
      wherein said proxy objects allow browsing while keeping expanded functionalities of said browser provided by said plug-in.

2. A browser plug-in firewall according to claim 1, wherein protection for a browser is defined per website, per page, per plug-in and per field of a form.

3. A browser plug-in firewall according to claim 1, comprising an embedded proxy emulating said browser to protect said browser from direct interaction originating from malicious plug-ins.

4. A browser plug-in firewall according to claim 1, comprising an embedded proxy emulating a plug-in to protect the browser from malicious plug-ins.

5. A browser plug-in firewall according to claim 3, comprising in combination an embedded proxy emulating a browser and an embedded proxy emulating a plug-in.

6. A method for protecting a browser, installed on a computerized device that runs said browser, from malicious plug-ins, comprising:
   a. providing at least one plug-in-proxy object for emulating said browser to a plug-in and at least a browser-proxy object for emulating said plug-in to said browser;
   b. embedding in said browser, a code which patches function(s) used by said browser to load or to create a plug-in object that communicates through an interface, for managing data exchanged between said browser and said plug-in, according to pre-defined security rules;
   c. interposing said browser and said plug-in, such that neither said web-browser sees the plug-in directly, nor the plug-in sees the web-browser directly;
   d. controlling the data exchanged between said browser and said plug-in, to choose which data said browser sends to said plug-in and vice versa by intercepting calls from said browser to said plug-in and vice versa and forcing calls to pass through said proxy objects;
      wherein an ensemble of said browser-proxy object and of said plug-in-proxy operates as a firewall for said browser, and wherein said proxy objects allow browsing while keeping expanded functionalities of said browser provided by said plug-in.

7. A method according to claim 6, wherein when the browser first attempts to load the plug-in the BPF intercepts the call and creates a plug-in proxy object and hands the plug-in proxy object to the browser.

8. A method according to claim 7, wherein the BPF loads the requested plug-in itself, and saves its address.

9. A method according to claim 7, wherein the BPF presents the browser to the plug-in as a browser proxy object.

* * * * *